(12) United States Patent
Ji et al.

(10) Patent No.: US 12,496,543 B2
(45) Date of Patent: Dec. 16, 2025

(54) FILTERING SYSTEM INCLUDING RECYCLABLE CERAMIC CATALYST FILTER AND METHOD OF MANAGING FILTERING SYSTEM

(71) Applicants: Samsung Electronics Co., Ltd., Suwon-si (KR); POSTECH Research and Business Development Foundation, Pohang-si (KR)

(72) Inventors: Sangmin Ji, Suwon-si (KR); Jongkyu Kim, Pohang-si (KR); Minseok Koo, Suwon-si (KR); Hyukjae Kwon, Suwon-si (KR); Jaerim Kim, Pohang-si (KR); Jae Yong Park, Pohang-si (KR); Jeonghyeon Park, Pohang-si (KR); Hyun Chul Lee, Suwon-si (KR)

(73) Assignees: SAMSUNG ELECTRONICS CO., LTD., Gyeonggi-Do (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 1050 days.

(21) Appl. No.: 17/539,207

(22) Filed: Dec. 1, 2021

(65) Prior Publication Data

US 2022/0401866 A1    Dec. 22, 2022

(30) Foreign Application Priority Data

Jun. 18, 2021    (KR) ......................... 10-2021-0079138

(51) Int. Cl.
*A61L 2/00*    (2006.01)
*B01D 39/00*    (2006.01)
(Continued)

(52) U.S. Cl.
CPC ........ *B01D 46/0027* (2013.01); *B01J 21/063* (2013.01); *B01J 23/30* (2013.01); *B01J 35/39* (2024.01); *B01J 37/343* (2013.01)

(58) Field of Classification Search
CPC .......... A61L 2/084; A61L 2/082; A61L 9/205; H01L 23/28; F12K 9/64
(Continued)

(56) References Cited

U.S. PATENT DOCUMENTS

2007/0253860 A1* 11/2007 Schroder .............. B01D 53/007
422/4
2010/0044582 A1* 2/2010 Cooper ...................... A61L 2/10
250/455.11
2021/0094026 A1    4/2021 Kwon et al.

FOREIGN PATENT DOCUMENTS

JP    2008104739 A    5/2008
JP    2019165849 A    10/2019
(Continued)

*Primary Examiner* — Monzer R Chorbaji
(74) *Attorney, Agent, or Firm* — CANTOR COLBURN LLP

(57) ABSTRACT

A filtering system includes a catalyst filter including a plurality of channels through which air is introduced, and a light-emitting device arranged to irradiate light to the catalyst filter for catalyst activation, where the light-emitting device includes a light source array including a plurality of first light sources corresponding one-to-one with the plurality of channels. Each of the plurality of first light sources may include a substrate, a first light-emitting device on the substrate, and a capsule which seals the first light-emitting device on the substrate. Only one first light-emitting device is provided in the capsule, or a second light-emitting device is further provided together with the first light-emitting device in the capsule.

23 Claims, 16 Drawing Sheets

(51) Int. Cl.
*B01D 46/00* (2022.01)
*B01J 19/08* (2006.01)
*B01J 21/06* (2006.01)
*B01J 23/30* (2006.01)
*B01J 35/39* (2024.01)
*B01J 37/34* (2006.01)
*G01N 21/00* (2006.01)

(58) Field of Classification Search
USPC ......... 422/14, 121–122, 24, 186.1; 174/525; 250/455.11, 454.11, 492.1; 96/224
See application file for complete search history.

(56) References Cited

FOREIGN PATENT DOCUMENTS

| | | | |
|---|---|---|---|
| JP | 202120161 | A | 2/2021 |
| KR | 1020160098631 | A | 8/2016 |
| KR | 1020180131843 | A | 12/2018 |
| KR | 102084775 | B1 | 3/2020 |
| KR | 1020200039863 | A | 4/2020 |
| KR | 102148123 | B1 | 8/2020 |
| KR | 102148432 | B1 | 8/2020 |
| KR | 1020210017995 | A | 2/2021 |
| KR | 1020210039201 | A | 4/2021 |

\* cited by examiner

FILTERING SYSTEM INCLUDING RECYCLABLE CERAMIC CATALYST FILTER AND METHOD OF MANAGING FILTERING SYSTEM

CROSS-REFERENCE TO RELATED APPLICATION

This application claims priority to Korean Patent Application No. 10-2021-0079138, filed Jun. 18, 2021, and all the benefits accruing therefrom under 35 U.S.C. § 119, the content of which in its entirety is herein incorporated by reference.

BACKGROUND

1. Field

The disclosure relates to a filter, and more particularly, to a filtering system including a recyclable ceramic catalyst filter.

2. Description of the Related Art

Filters for reducing fine dust are typically formed in a woven or nonwoven form by using melt blown, glass fiber or plastic, and the filters are be classified into medium, high efficiency particulate air ("HEPA"), and ultra-low particulate air ("ULPA") grades depending on performance thereof. Also, in a case including a volatile organic compound ("VOC") with fine dust, the VOC may be filtered with a deodorizing filter that adsorbs (deodorizes) by using carbon, such as activated carbon. Such a filter is currently being selectively applied to air purifiers, heat exchange ventilators, or air conditioners in buildings. Performances are different depending on the filter, but in the case of an HEPA filter, the HEPA filter has high performance of reducing fine dust particles with a size of 0.3 micrometers ($\mu$m) to 99.97% by adsorption.

SUMMARY

Embodiments are directed to a filtering system including a recyclable ceramic catalyst filter that may be repeatedly used.

Embodiments are directed to a filtering system including a ceramic catalyst filter capable of simultaneously filtering particulate matter and gaseous matter with a single filter.

According to an embodiment, a filtering system includes: a catalyst filter including a plurality of channels through which air is introduced; and a light-emitting unit which radiate light towards the catalyst filter for catalyst activation, where the light-emitting unit includes a light source array including a plurality of first light sources corresponding one-to-one with the plurality of channels.

In an embodiment, each of the plurality of first light sources may include: a substrate; a first light-emitting device on the substrate; and a capsule which seals the first light-emitting device on the substrate. In such an embodiment, only one first light-emitting device may be in the capsule. In such an embodiment, each of the plurality of first light sources may further include a second light-emitting device on the substrate in the capsule together with the first light-emitting device.

In an embodiment, the light source array may further include a plurality of second light sources corresponding one-to-one with an area between the channels of the catalyst filter and may radiate light to the area. In such an embodiment, each of the plurality of second light sources may include: a substrate; a first light-emitting device on the substrate; and a capsule configured to seal the first light-emitting device on the substrate. In such an embodiment, only one first light-emitting device is in the capsule. In such an embodiment, each of the plurality of second light sources may further include a second light-emitting device on the substrate in the capsule together with the first light-emitting device. In such an embodiment, the first and second light-emitting devices may include a light emitting diode ("LED"). In such an embodiment, the filtering system may further include at least one selected from an electrical energy source, an ionic energy source, and a thermal energy source.

In an embodiment, the catalyst filter may include: a single body structure including a first surface blocking a first material; and a second surface from which a second material passing through the first surface is removed, where the second surface may be a portion to be activated as a first catalyst layer for removing the second material by the light radiated thereto. In such an embodiment, the single body structure may be porous. In such an embodiment, the single body structure may include a same catalyst material as a whole. In such an embodiment, each of the first and second surfaces may include surfaces parallel to each other in vertical and horizontal directions. In such an embodiment, a second catalyst layer may further be disposed on the second surface.

In an embodiment, the single body structure may include: a plurality of first grooves with inlets on a side thereof through which the first and second materials are introduced; and a plurality of second grooves with inlets on a side thereof through which the second material is discharged.

In an embodiment, the first material may include particulate contaminants, such as fine dust or biological contaminants, such as microorganisms, and the second material may include gaseous contaminants, such as volatile organic compounds ("VOC"s).

In an embodiment, the same catalyst material includes a photocatalytic material which is activated by the light radiated to the second surface.

In an embodiment, the same catalyst material may include a metal compound.

In an embodiment, the second catalyst layer may include a catalyst layer to be activated by different energy together with the light radiated to the second surface.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
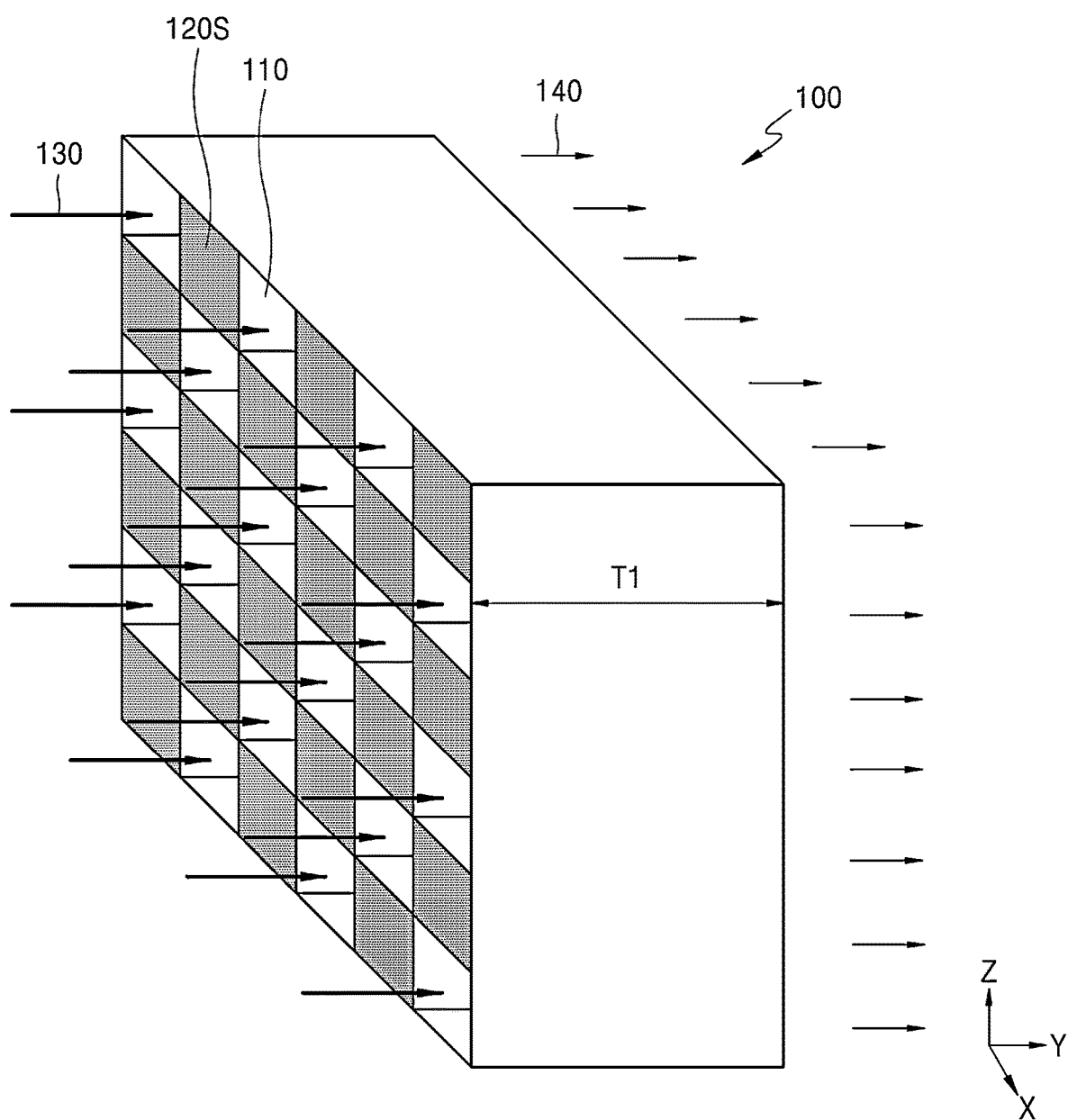
FIG. 1 is a perspective view of a ceramic catalyst filter (a first catalyst filter) according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a filtering system including a recyclable ceramic catalyst filter according to an embodiment will be described in detail with reference to the accompanying drawings. In the drawings, thickness of layers or regions may be somewhat exaggerated for clarity of the specification.

Catalyst filters illustrated herein may be one of means for purifying air. Further, the catalyst filters may be one of means for filtering or removing materials that are harmful or may be harmful to human breathing from the air. The catalyst filters illustrated here may be one of means for discharging a relatively clean fluid than an inlet side. The fluid may be a gas including particle or particulate components.

First, a recyclable ceramic catalyst filter (hereinafter, a first catalyst filter 100) according to an embodiment will be described in detail.

FIG. 1 is a perspective view of a ceramic catalyst filter (the first catalyst filter) according to an embodiment.

Referring to FIG. 1, an embodiment of the first catalyst filter 100 includes an inlet surface through which a material 130 is introduced and an outlet surface through which a gas 140 is discharged. The material 130 may include at least two kinds of materials that are desired to be filtered or removed. In one embodiment, for example, the material 130 may include a particulate first material and a gaseous second material. The first catalyst filter 100 has a predetermined thickness T1 in a direction (Y-axis direction) in which the gas 140 produced as a result of the catalytic reaction of the first catalyst filter 100 with some of the material 130 is discharged. The first catalyst filter 100 includes a plurality of first grooves 110 having an inlet in a direction in which the material 130 is introduced and having a bottom in an opposite direction (a Y-axis direction). The material 130 flows in the first catalyst filter 100 through the plurality of first grooves 110. The plurality of first grooves 110 are regularly arranged or defined. The plurality of first grooves 110 may be arranged parallel to each other. The first catalyst filter 100 includes a plurality of first surfaces 120S in the direction in which the material 130 is introduced. The plurality of first surfaces 120S are regularly arranged. The plurality of first surfaces 120S are arranged between the plurality of first grooves 110. In such an embodiment, one first surface 120S is between the plurality of first grooves 110 in horizontal and vertical directions. In such an embodiment, one first groove 110 is provided between the plurality of first surfaces 120S in the horizontal and vertical directions. One first groove 110 is surrounded by four first surfaces 120S, and one first surface 120S is surrounded by four first grooves 110.

Figure 2:
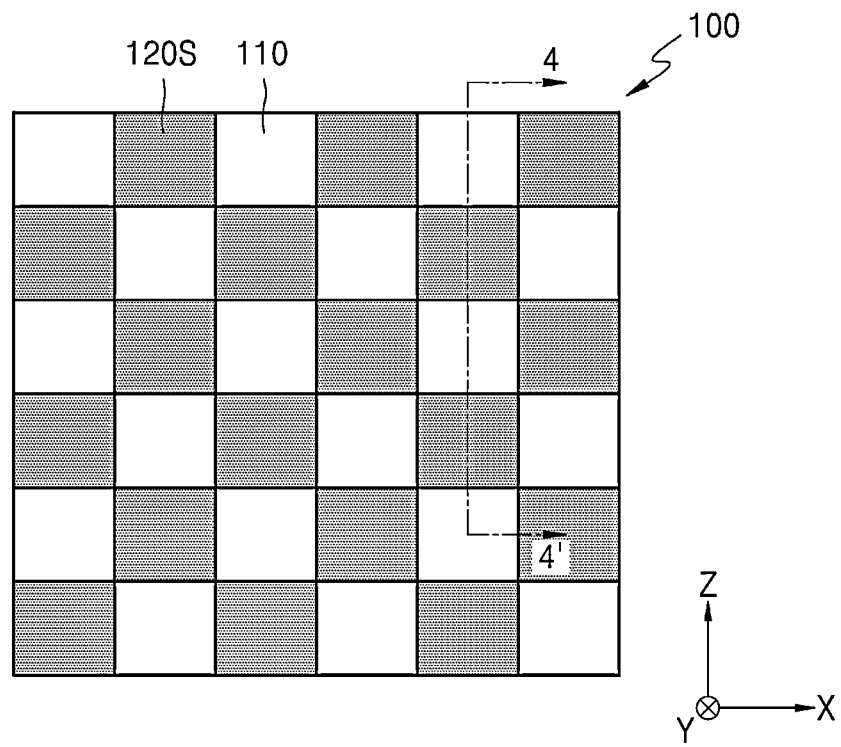
FIG. 2 is a front view of an air inlet surface of the ceramic catalyst filter of FIG. 1.

FIG. 2 is a front view of the air inlet surface of the first catalyst filter 100 shown in FIG. 1.

Figure 3:
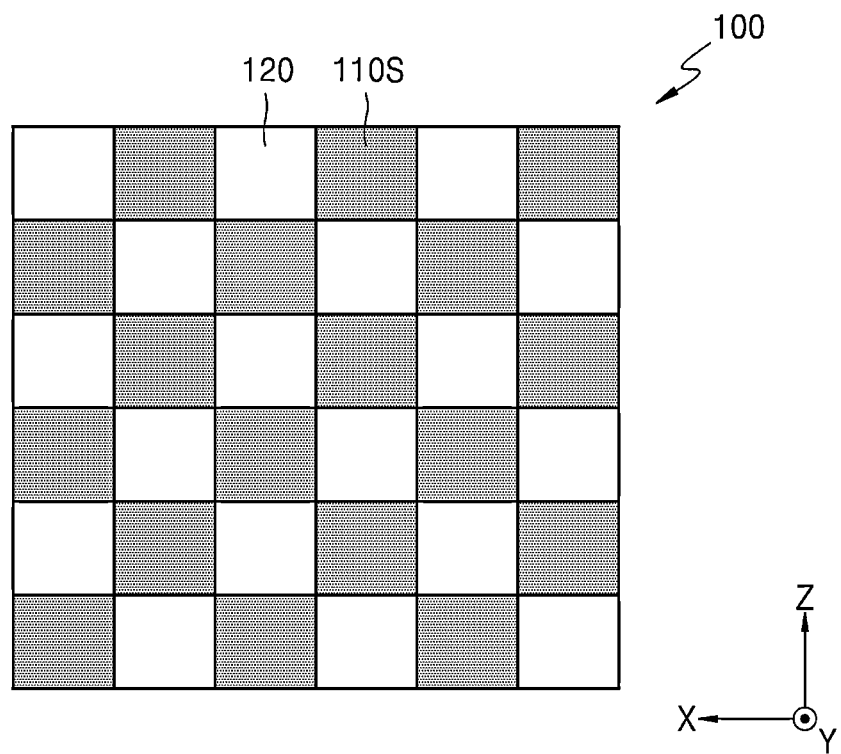
FIG. 3 is a front view of an air outlet surface of the ceramic catalyst filter of FIG. 1.

FIG. 3 shows a rear surface of the first catalyst filter 100, that is, a gas outlet surface.

Referring to FIG. 3, an embodiment of the first catalyst filter 100 includes a plurality of second grooves 120 and a plurality of second surfaces 110S on a gas discharge side. The plurality of second grooves 120 may become outlets through which gas is discharged. The gas discharged through the second grooves 120 may be a relatively clean or harmless gas as a result of filtering harmful materials or impurities from the material 130 introduced through the first groove 110, or may include relatively clean or harmless gas and air. As a result, the plurality of second grooves 120 may functions as channels through which air is introduced. In the first catalyst filter 100, the density of channels (the number of channels/unit volume), that is, the density of the second grooves 120, may be in a range of about 1 to about 500, but is not limited thereto. The plurality of second grooves 120 are regularly arranged. The plurality of second surfaces 110S are also regularly arranged. The arrangement relationship between the plurality of second grooves 120 and the plurality of second surfaces 110S may correspond to the arrangement relationship between the plurality of first grooves 110 and the plurality of first surfaces 120S. The plurality of second surfaces 110S respectively correspond to the plurality of first grooves 110, and the plurality of second grooves 120 respectively correspond to the plurality of first surfaces 120S.

Referring to FIGS. 1 and 3 together, in an embodiment, the second surface 110S is a bottom of the first groove 110, and the first surface 120S is a bottom of the second groove 120.

Figure 4:
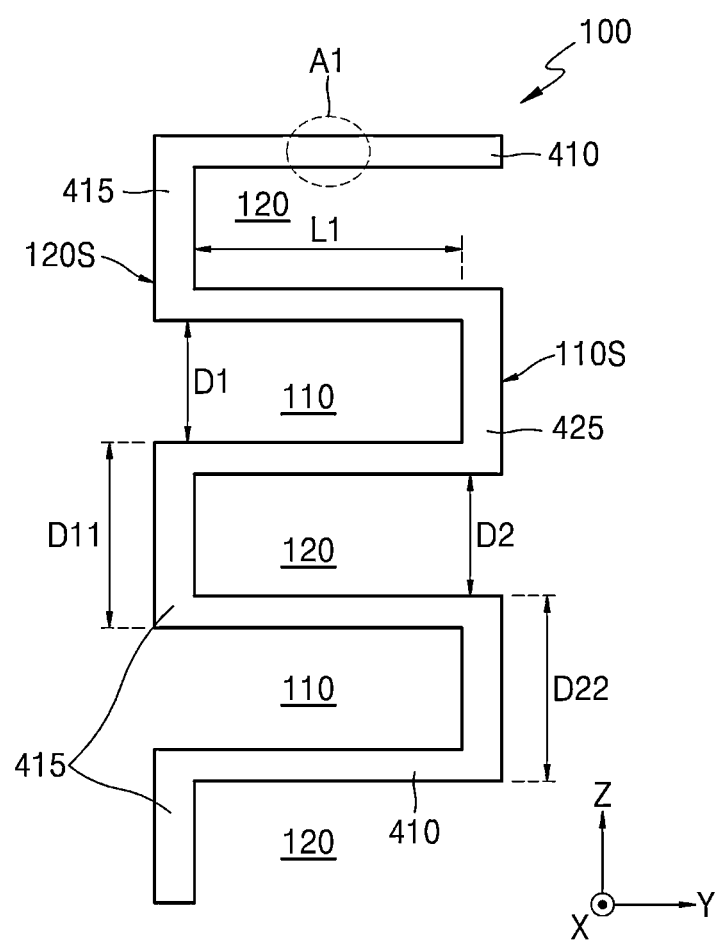
FIG. 4 is a cross-sectional view taken along line 4-4' of FIG. 2.

FIG. 4 shows a cross-sectional view taken along line 4-4' of FIG. 2.

An embodiment of the first catalyst filter 100 may have a monolithic structure or be defined by a single body frame. The first catalyst filter 100 may have a frame formed entirely of a same material (e.g., a catalyst material). Although the first catalyst filter 100 is a single body integrally formed and connected as a whole, for convenience of description, the first catalyst filter 100 is divided into a horizontal part and a vertical part.

Referring to FIG. 4, an embodiment of the first catalyst filter 100 may be regarded as a structure having a frame in which a plurality of first and second grooves 110 and 120 are sequentially stacked in the Z-axis direction.

In such an embodiment, the first catalyst filter 100 includes a plurality of horizontal portions 410 and a plurality of vertical portions 415 and 425. In such an embodiment, the plurality of horizontal portions 410 are spaced apart from each other in the Z-axis direction. Here, the Z-axis direction is referred to as a vertical direction for convenience. The plurality of horizontal portions 410 are parallel to each other in the Y-axis direction. Lengths of the plurality of horizontal portions 410 may be the same as each other. The Y-axis direction may be a direction in which the gas 140 generated as a result of the catalytic reaction is discharged. For convenience, the Y-axis direction is referred to as the horizontal direction. The plurality of vertical portions 415 and 425 are parallel to each other and spatially spaced apart from each other. The plurality of vertical portions 415 and 425 are arranged between the plurality of horizontal portions 410. The plurality of horizontal portions 410 are also arranged between the plurality of vertical portions 415 and 425. The plurality of horizontal portions 410 are connected to each other via a plurality of vertical portions 415 and 425. The plurality of vertical portions 415 and 425 are connected to each other via a plurality of horizontal portions 410. The plurality of vertical portions 415 and 425 include a plurality of first vertical portions 415 and a plurality of second vertical portions 425. The plurality of first vertical portions 415 and the plurality of second vertical portions 425 are separated from each other in the Y-axis direction. The plurality of first vertical portions 415 are separated from each other in the Z-axis direction, and arranged parallel to each other in the Z-axis direction. The plurality of second vertical portions 425 are also separated from each other in the Z-axis direction, and arranged parallel to each other in the Z-axis direction. The plurality of first vertical portions 415 are arranged on a side in which the material 130 flows into. The plurality of second vertical portions 425 are arranged on a side where the gas 140 generated by a catalytic reaction is discharged.

The plurality of horizontal portions 410 may be the walls of the first and second grooves 110 and 120. In an embodiment, each of the plurality of horizontal portions 410 is between the first groove 110 and the second groove 120 to form a boundary between the first and second grooves 110 and 120. The walls refer to the side walls of the first and second grooves 110 and 120. The thicknesses of the plurality of horizontal portions 410 may be the same from each other, but there may be portions thereof having different thicknesses. The thickness of the plurality of horizontal portions 410 may be the same as the thickness of the plurality of vertical portions 415 and 425, but not being limited thereto. Alternatively, the thickness of the plurality of horizontal portions 410 and the thickness of the plurality of vertical portions 415 and 425 may be different from each other. The horizontal portions 410, which are walls of the first groove 110, are separated by a first interval D1 in the Z-axis direction. The horizontal portion 410, which are walls of the second groove 120, are separated by a second interval D2 in the Z-axis direction. In an embodiment, the first interval D1 may be the same as the second interval D2. In such an embodiment, sizes or length of inlets of the first and second grooves 110 and 120 may be the same as each other. Lengths L1 of the plurality of horizontal portions 410 in the Y-axis direction may be the same as each other. Depths of the first and second grooves 110 and 120 may be determined based on the lengths L1 of the horizontal portions 410 in the Y-axis direction. Accordingly, the first and second grooves 110 and 120 may have the same depths as each other. In an alternative embodiment, the depth of the first groove 110 and the depth of the second groove 120 may be different from each other. The plurality of first vertical portions 415 may be bottoms of the second grooves 120. The plurality of second vertical portions 425 may be bottoms of the first grooves 110. The air permeability of the bottom of the first groove 110 may be different from that of the bottom of the second groove 120. The bottom of the second groove 120 may have a configuration to block a gaseous material. A size or length D11 of the first vertical portion 415 and a size or length D22 of the second vertical portion 425 may be the same as each other. The thicknesses of the first and second vertical portions 415 and 425 in the Y-axis direction may be the same as each other.

The plurality of horizontal portions 410 and the plurality of vertical portions 415 and 425 are connected or integrally formed as a single unit, and may be a ceramic material layer including or formed of a same catalyst material. The catalyst material may variously selected depending on energy supplied to the first catalyst filter 100 for activation of the catalyst material.

In one embodiment, for example, where the energy supplied to the first catalyst filter 100 is optical energy, the catalyst material may be a metal compound capable of causing a photocatalytic reaction, for example, $TiO_2$ or $WO_3$. The optical energy may include ultraviolet energy or visible light energy. In an embodiment, energy supplied to the first catalyst filter 100 may also include other energy together with the optical energy. In one embodiment, for example, the other energy may include electrical energy, ion energy, or heat energy.

The light energy supplied to the first catalyst filter 100 may be energy that activates at least the horizontal portion 410 and further activates some or all of the first and second vertical portions 415 and 425 to cause a catalytic reaction with respect to gas components in the material 130. As a result of supplying such energy, a catalyst layer is formed on a surface of the first catalyst filter 100 to which the optical energy is applied or radiated. The surface of the first catalyst filter 100 to which the optical energy is radiated may be a side and a bottom surface of the second groove 120. The catalyst layer may be a region (layer) activated by the supply of optical energy. The gas component in the material 130 may be decomposed by causing a catalytic reaction while passing through the catalyst layer (e.g., reacting with oxygen when optical energy is supplied). The gas component may be a volatile organic compound ("VOC") or another harmful gas. The volatile organic compounds may include, for example, formaldehyde, acetaldehyde, ammonia, toluene, acetic acid, or the like.

Figure 5:
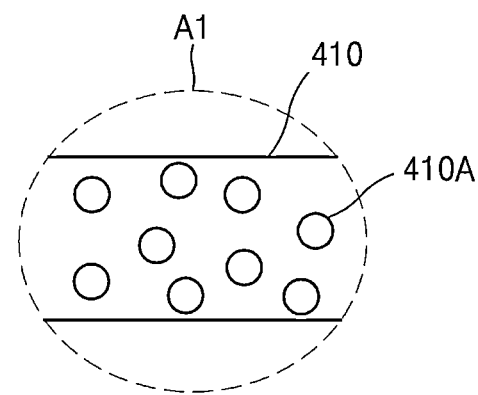
FIGS. 5 and 6 are enlarged cross-sectional views of a first region A1 of FIG. 4.

FIG. 5 is an enlarged view of a first region A1 of the horizontal portion 410 of FIG. 4.

Referring to FIG. 5, in an embodiment, the horizontal portion 410 includes pores 410A. In one embodiment, for example, the first and second vertical portions 415 and 425 may not include pores.

In one alternative embodiment, for example, the first and second vertical portions 415 and 425 may also include pores, but the pore density of the first and second vertical portions 415 and 425 may be less than that of the horizontal portion 410.

In another alternative embodiment, for example, the first vertical portion 415 may not include pores, and the second vertical portion 425 may not include pores.

In another alternative embodiment, for example, the first and second vertical portions 415 and 425 may include pores, but the pore density of the second vertical portion 425 may be less than the first vertical portion 415.

Figure 6:
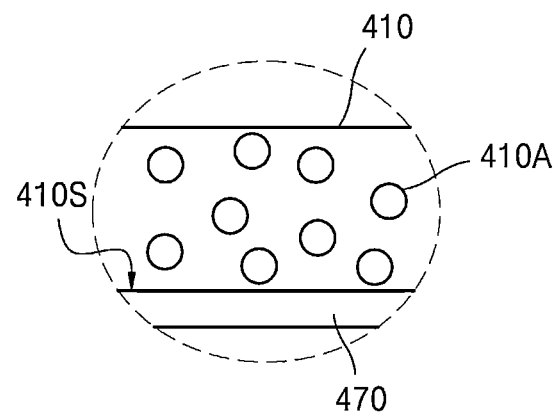

FIG. 6 is an enlarged view of the first region A1 of the horizontal portion 410 of FIG. 4.

Referring to FIG. 6, in an embodiment, the horizontal portion 410 includes pores 410A. In such an embodiment, a first catalyst layer 470 is provided on a surface 410S of the horizontal portion 410 to which energy is radiated. The first catalyst layer 470 covering the surface 410S of the horizontal portion 410 to which the energy is radiated may include a different material from that of the horizontal portion 410. In one embodiment, for example, where the horizontal portion 410 includes a first catalyst material, the first catalyst layer 470 may include a second catalyst material that is different from the first catalyst material. In one embodiment, for example, when the horizontal portion 410 is a catalyst material that may be activated with one energy selected from among the four energies (e.g., thermal energy), the first catalyst layer 470 may be a catalyst material that may be activated by one of the other energies (e.g., optical energy) that is not selected among the above four energies. Therefore, when the first catalyst layer 470 is provided, two different energy may be simultaneously supplied to the first catalyst filter 100.

Figure 7:
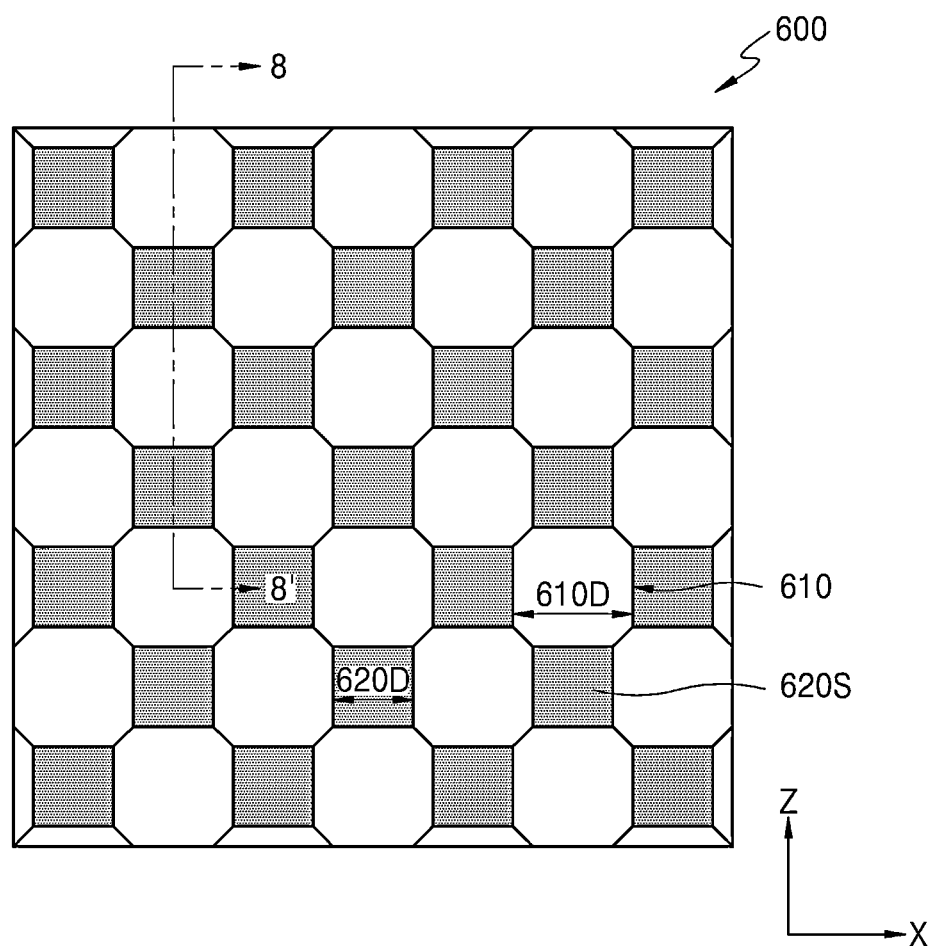
FIG. 7 is a front view of an air inlet surface of a ceramic catalyst filter (a second catalyst filter) according to another embodiment.

FIG. 7 shows a recyclable ceramic catalyst filter (hereinafter, a second catalyst filter 600) according to an alternative embodiment.

As described above with reference to FIG. 2 or FIG. 3, in an embodiment of the first catalyst filter 100, the size of the first groove 110 is the same as the size of the first surface 120S between the first grooves 110. In such an embodiment, the size of the second groove 120 is the same as the size of the second surface 110S between the second grooves 120. In such an embodiment, the first groove 110 and the first surface 120S may be symmetrical to each other, and the second groove 120 and the second surface 110S may also be symmetrical to each other.

Referring to FIG. 7, an embodiment of the second catalyst filter 600 includes a plurality of first grooves 610 and a plurality of first surfaces 620S. Air flowing into the second catalyst filter 600 is discharged through the first groove 610. The plurality of first grooves 610 are regularly arranged or defined. The first grooves 610 are separated from each other in the horizontal and vertical directions. In such an embodiment, a first surface 620S is disposed between the plurality of first grooves 610. Four first surfaces 620S are arranged around one first groove 610. Four first grooves 610 are around one first surface 620S. The plurality of first surfaces 620S are regularly arranged. The plurality of first surfaces 620S are separated from each other in the horizontal and vertical directions, respectively. The first grooves 610 are in contact with each other in a diagonal direction, but the plurality of first surfaces 620S are separated from each other in the diagonal direction. The first groove 610 has a size greater than that of the first surface 620S. A size or length 610D of an inlet of the first groove 610 is greater than a size or length 620D of the first surface 620S. Accordingly, the first groove 610 and the first surface 620S are asymmetrical to each other. The shape of the first groove 610 and the shape of the first surface 620S may be different from each other. Each of the first grooves 610 may be viewed as a whole as having a square shape, in which four corners are cut from a square. The first surface 620S has a square shape. In such an embodiment, the first groove 610 may have a shape of a regular octagon in which lengths of sides of four corners are less than the lengths of adjacent sides in a regular octagon.

Figure 8:
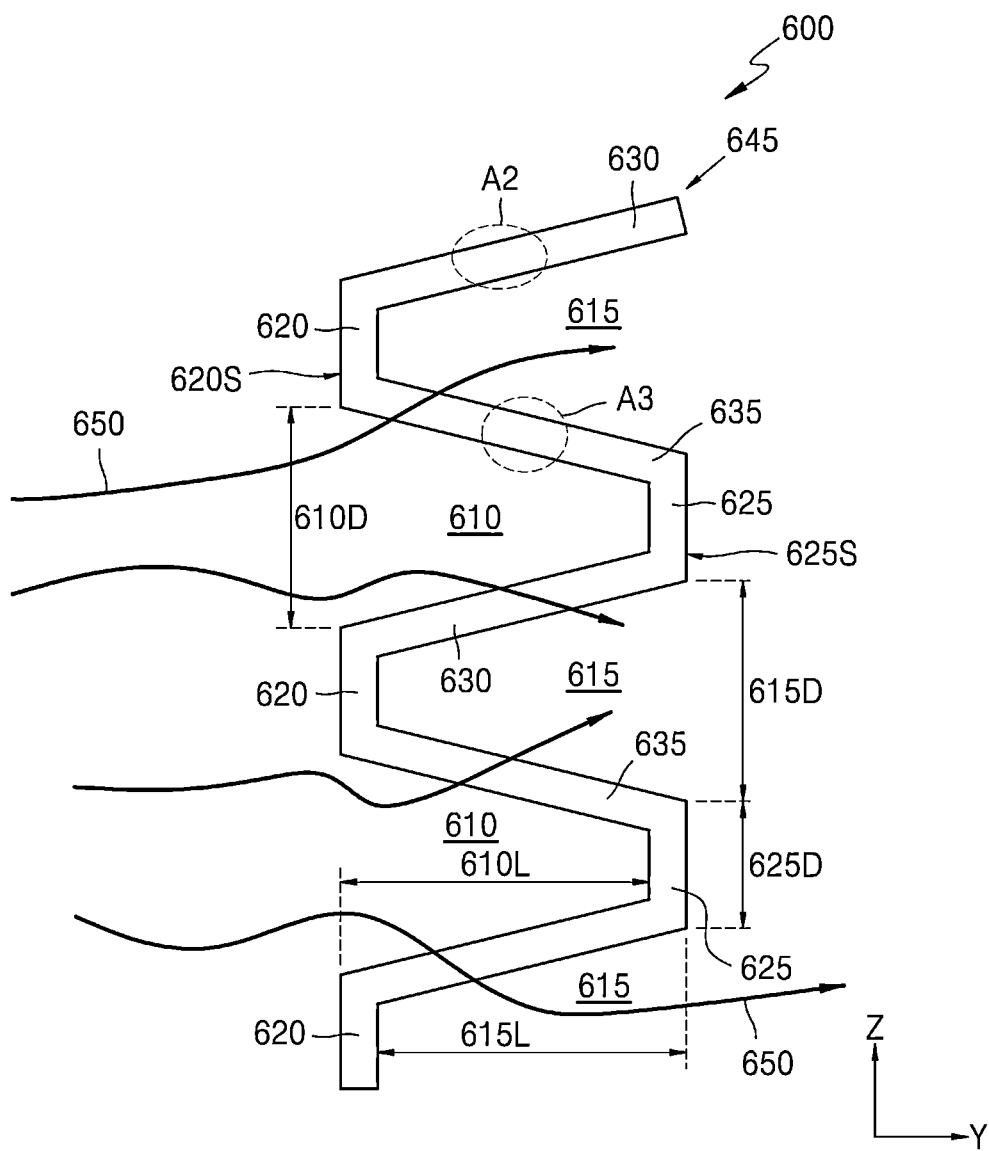
FIG. 8 is a cross-sectional view taken along line 8-8' of FIG. 7.

FIG. 8 is a cross-sectional view taken along line 8-8' of the second catalyst filter 600 of FIG. 7.

Referring to FIG. 8, the second catalyst filter 600 includes a plurality of first grooves 610 sequentially stacked in the Z-axis direction. In addition, the second catalyst filter 600 includes a plurality of second grooves 615 sequentially stacked in the Z-axis direction. The plurality of first grooves 610 and the plurality of second grooves 615 are alternately stacked in the Z-axis direction. The plurality of first grooves 610 and the plurality of second grooves 615 are formed in opposite directions. In such an embodiment, inlets of the plurality of first grooves 610 and inlets of the plurality of second grooves 615 are directed in opposite directions. The inlet of the first groove 610 faces a direction in which air 650 flows, that is, the − direction of the Y-axis. In such an embodiment, the inlet of the second groove 615 faces a direction in which the air 650 flows out, that is, the + direction of the Y-axis. The first groove 610 has a shape in which the size or length gradually decreases in the + direction of the Y-axis. In such an embodiment, the size or length of the second groove 615 increases in the + direction of the Y-axis. A size or length 615D of the inlet of the second groove 615 may be the same as a size or length 610D of the inlet of the first groove 610. The size or length 615D of the inlet of the second groove 615 may be greater than a size or length 625D of the plurality of vertical portions 620 and 625. The depth 610L of the first groove 610 may be the same as or different from the depth 615L of the second groove 615. The plurality of first grooves 610 and the plurality of second grooves 615 are separated from each other by a single body frame 645. In such an embodiment, the single body frame 645 is between the plurality of first grooves 610 and the plurality of second grooves 615. The single body frame 645 may include a same material as the first catalyst filter 100. The single body frame 645 includes a plurality of vertical portions 620 and 625 and a plurality of inclined portions 630 and 635. Each of the vertical and inclined portions 620, 625, 630, and 635 is a continuously connected to or integrally formed with each other as a single unit. Accordingly, there is no boundary between the vertical and inclined portions 620, 625, 630, and 635. The plurality of vertical portions 620 and 625 are between the plurality of inclined portions 630 and 635. The plurality of inclined portions 630 and 635 are between the plurality of vertical portions 620 and 625. The plurality of vertical portions 620 and 625 are parallel to the Z-axis direction and separated from each other in the Z-axis direction. The plurality of first vertical portions 620 and the plurality of second vertical portions 625 of the plurality of vertical portions 620 and 625 are separated from each other in the Y-axis direction. The plurality of inclined portions 630 and 635 are also separated from each other in the z-axis direction. Each of the plurality of second vertical portions 625 becomes a bottom of the first groove 610. Each of the plurality of first vertical portions 620 become a bottom of the second groove 615. The air permeability of the bottom of the first groove 610 may be different from the air permeability of the bottom of the second groove 615. The bottom of the second groove 615 may block ventilation of a gaseous material. The first surfaces 620S of the plurality of first vertical portions 620 on a side thereof through which air is introduced is parallel to the second surfaces 625S of the plurality of second vertical portions 625. The size of the first surface 620S may be the same as the size of the second surface 625S.

The plurality of inclined portions 630 and 635 include a plurality of first inclined portions 630 having a positive inclination and a plurality of second inclined portions 635 having a negative inclination. The plurality of first inclusion portions 630 are parallel to each other and spatially separated from each other. The plurality of second inclined portions 635 has a same structure as the plurality of first inclusion portions. The first inclined portion 630 and the second inclined portion 635 may be symmetrical with each other with respect to the Y-axis. The first inclined portion 630 and the second inclined portion 635 are inclined sidewalls of the first groove 610. Also, the first inclusion portion 630 and the second inclined portion 635 are inclined side walls of the second groove 615. A gap between the first inclined portion 630 and the second inclined portion 635 constituting the sidewalls of the first groove 610 decreases as moving in the positive (+) direction of the Y-axis. A gap between the first inclined portion 630 and the second inclined portion 635 constituting the sidewalls of the second groove 615 increases as moving in the positive (+) direction of the Y-axis. Between the plurality of first inclined portions 630, the first and second vertical portions 620 and 625 and the second inclined portion 635 are disposed.

The configuration of the second and third portions A2 and A3 of the single body frame 645 may be the same as that of A1 of FIG. 5 or FIG. 6. In such an embodiment, the plurality of first inclined portions 630 and the plurality of second inclined portions 635 may include pores 410A. In an embodiment, an additional catalyst layer may be further provided on a surface of the plurality of first and second inclined portions 630 and 635 through which air is discharged, that is, on side surfaces and the bottom surface of the second groove 615. The material of the catalyst layer provided in this way may be different from that of the single body frame 645. In an embodiment, the single body frame 645 has a shape having a plurality of protrusions protruding in the positive (+) direction of the Y-axis or a shape having a plurality of protrusions projecting in the negative (−) direction of the Y-axis.

Figure 9:
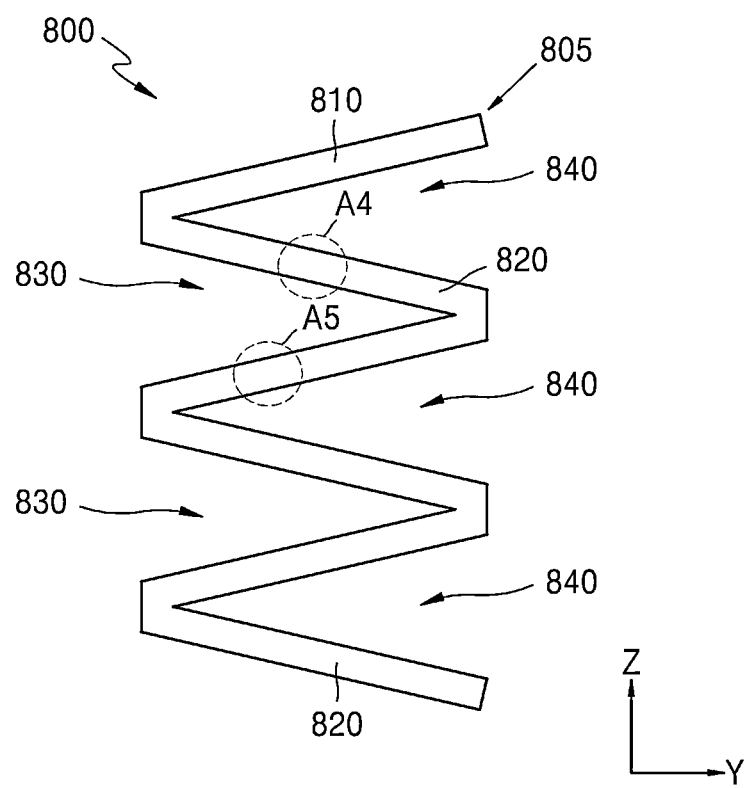
FIG. 9 is a cross-sectional view illustrating a modified version of the ceramic catalyst filter of FIG. 8, according to another embodiment.

FIG. 9 shows a recyclable ceramic catalyst filter (hereinafter, a third catalyst filter 800) according to another embodiment.

FIG. 9 shows a modified embodiment of the second catalyst filter 600 of FIG. 8.

Referring to FIG. 9, an embodiment of the third catalyst filter 800 includes a single body frame 805, and includes a plurality of first grooves 830 and a plurality of second grooves 840 defined by the single body frame 805. The single body frame 805 may be the same shape as the single body frame 645 of FIG. 8 except that the single body frame 805 does not include the plurality of vertical portions 620 and 625. In such an embodiment, the single body frame 805 includes a plurality of first inclined portions 810 and a plurality of second inclined portions 820, and does not include vertical portions connecting the first and second inclined portions 810 and 820. In the single body frame 805, one end of the first inclined portion 810 is connected to that of the second inclined portion 820, and the other ends facing the one ends thereof are separated from each other. The first and second inclined portions 810 and 820 constituting the inclined sidewalls of the first groove 830 decreases as moving in the positive (+) direction of the Y-axis. As a result, the first groove 830 has a gradually reducing size or length in the positive (+) direction of the Y-axis, that is, a wedge shape. One end of the first inclined portions 810 is connected to one end of the second inclined portion 820, the first and second inclined portions 810 and 820 constitute the inclined sidewalls of the second groove 840, and the other ends thereof gradually widen in the positive (+) direction of the Y-axis. Accordingly, the second groove 840 has a shape in which the sizer or length gradually increases in the positive (+) direction of the Y-axis, that is, a wedge shape.

The third catalyst filter 800 may be the same as the second catalyst filter 600 of FIG. 8 except that the vertical portions 620 and 625 of the single body frame 645 are omitted and portions of the inclined portions 630 and 635 connected to the vertical portions 620 and 625 are directly connected to each other.

In an embodiment, as shown in FIG. 9, an inlet size of the first groove 830 through which air is introduced may be the same as an inlet size of the second groove 840 through which the air is discharged.

In an embodiment, the configuration of the fourth and fifth portions A4 and A5 of the single body frame 805 may be the same as that of A1 of FIG. 5 or FIG. 6. In such an embodiment, the plurality of first inclined portions 810 and the plurality of second inclined portions 820 may include pores 410A. In an embodiment, an additional catalyst layer may further be provided on surfaces of the plurality of first and second inclined portions 810 and 820 through which air flows out, that is, on a side surface of the second groove 840. In such an embodiment, the material of the catalyst layer may be different from that of the single body frame 805.

Figure 10:
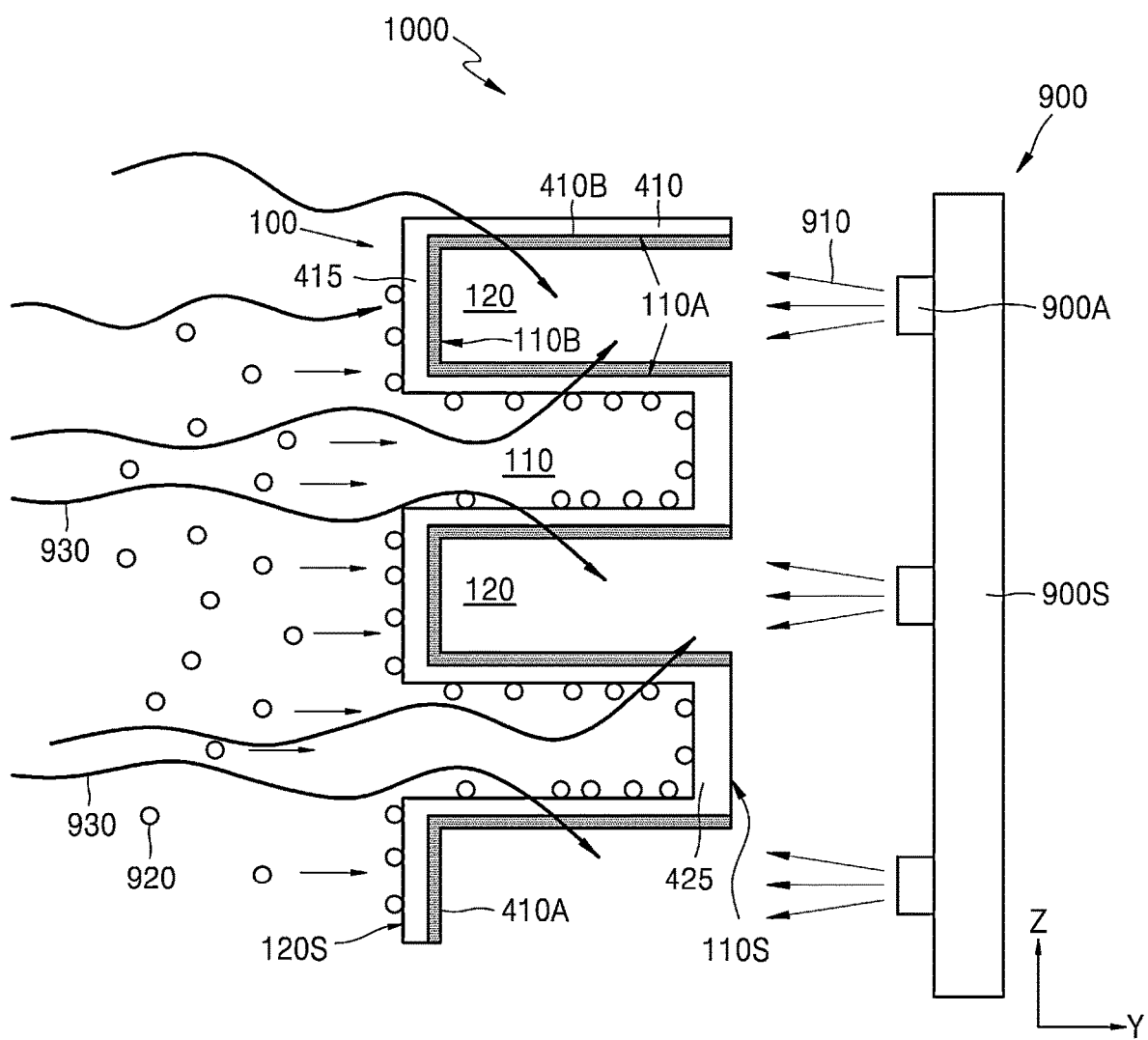
FIG. 10 is a cross-sectional view of a filtering system including a ceramic catalyst filter according to an embodiment.

FIG. 10 shows a first filtering system 1000 including a recyclable ceramic catalyst filter according to an embodiment.

Referring to FIG. 10, an embodiment of the first filtering system 1000 includes a first catalyst filter 100 and a light-emitting unit (or a light emitter) 900. The light-emitting unit 900 may include a substrate 900S and a plurality of first light sources 900A, which collectively define an array on the substrate 900S. The first filtering system 1000 may be operated at room temperature and pressure. The light-emitting unit 900 may generate light 910 that activates a surface of the first catalyst filter 100 from which air is discharged. Light 910 generated from the first light sources 900A constituting the array of the light-emitting unit 900 may be radiated into the second grooves 120 of the first catalyst filter 100. A surface of the second groove 120 to which the light 910 is radiated is activated to become a catalyst layer 410B. The first light sources 900A constituting the array of the light-emitting unit 900 correspond one-to-one to the second grooves 120 that are channels. In one embodiment, for example, a radiation angle of the light 910 emitted from each of the first light sources 900A may be controlled considering the size (e.g., diameter and depth) of the second grooves 120. In one embodiment, for example, the radiation angle of the first light sources 900A may be limited so that the light 910 reaches a bottom surface 110B of the second groove 120. The limitation of the radiation angle of the first light sources 900A may be determined in a process of manufacturing the first light sources 900A.

Figure 17:
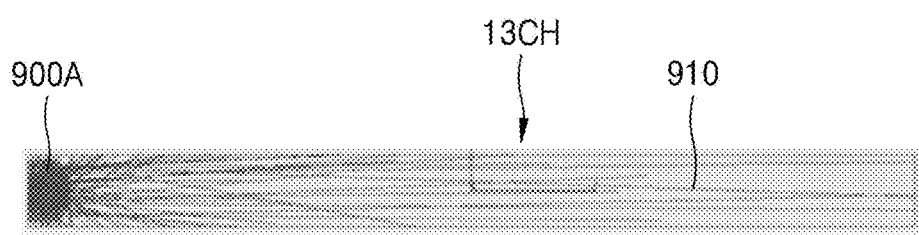
FIG. 17 is a photograph showing a case in which light emitted from a light source propagates into a channel and reaches the end of the channel in a light transmission experiment of the channel of a catalyst filter according to an embodiment.

In an embodiment, as illustrated in FIG. 17, light 910 emitted from the first light sources 900A propagates from a channel 13CH into the channel 13CH along the channel 13CH and reaches the end of the channel 13CH. In FIG. 17, the channel 13CH corresponds to the second groove 120, and the end of the channel 13CH corresponds to the bottom surface 110B of the second groove 120.

As a result, the light 910 emitted from each of the first light sources 910A may be radiated to an entire inner surface of the corresponding second groove 120. Accordingly, the entire inner surface of the second groove 120, that is, both the side surfaces 110A and the bottom surface 110B of the second groove 120, may be used as the catalyst layer 410B. As the entire side surfaces 110A and the bottom surface 110B of the second groove 120 are used as the catalyst layer 410B, the filtering efficiency may be increased, and in particular, the removal efficiency of gas components may further be increased as described below.

Hereinafter, a filtering process, that is, a removal process of a first material 920 and a second material 930 flowing into the first catalyst filter 100 in In the first filtering system 1000 will be described. The first material 920 may include particulate materials. In one embodiment, for example, the first material 920 may include particles or microorganisms. The particles may be, for example, particles having a particle diameter of about 10 micrometers (μm) or less, that is, fine particles of PM10 or less. In one embodiment, for example, the fine particles may include, for example, fine dust or ultrafine dust having a particle diameter less than that of fine dust, but are not limited thereto. In one embodiment, for example, the microorganisms may include a virus or bacterium, and is not limited thereto. The second material 930 may include gaseous materials, for example, the VOC described above. The second material 930 may include organic compounds. The first material 920 may not pass through the horizontal portion 410 that is a wall between the first and second grooves 110 and 120, also may not pass through the first and second vertical portions 415 and 425, and is piled up on the wall of the first groove 110. The side and bottom surfaces of the first groove 110 and the first surface 120S of the first vertical portion 415 are collectively referred to as a first surface of the first catalyst filter 100 for filtering the first material 920.

In the first catalyst filter 100, at least the horizontal portion 410 may be a porous material layer including pores 140A. Accordingly, the gaseous second material 930 may be introduced into the second groove 120 through at least the horizontal portion 410, that is, the sidewalls of the first groove 110. In this process, the second material 930 may be decomposed by a catalytic reaction while passing through the catalyst layer 410B. In one embodiment, for example, where the second material 930 includes formaldehyde (HCHO), the formaldehyde may be decomposed into water and carbon dioxide ($CO_2$) by a catalytic reaction on a surface of the photocatalyst present in the second groove 120 while passing through the catalyst layer 410B. Thus, the formaldehyde may be removed.

Figure 11:
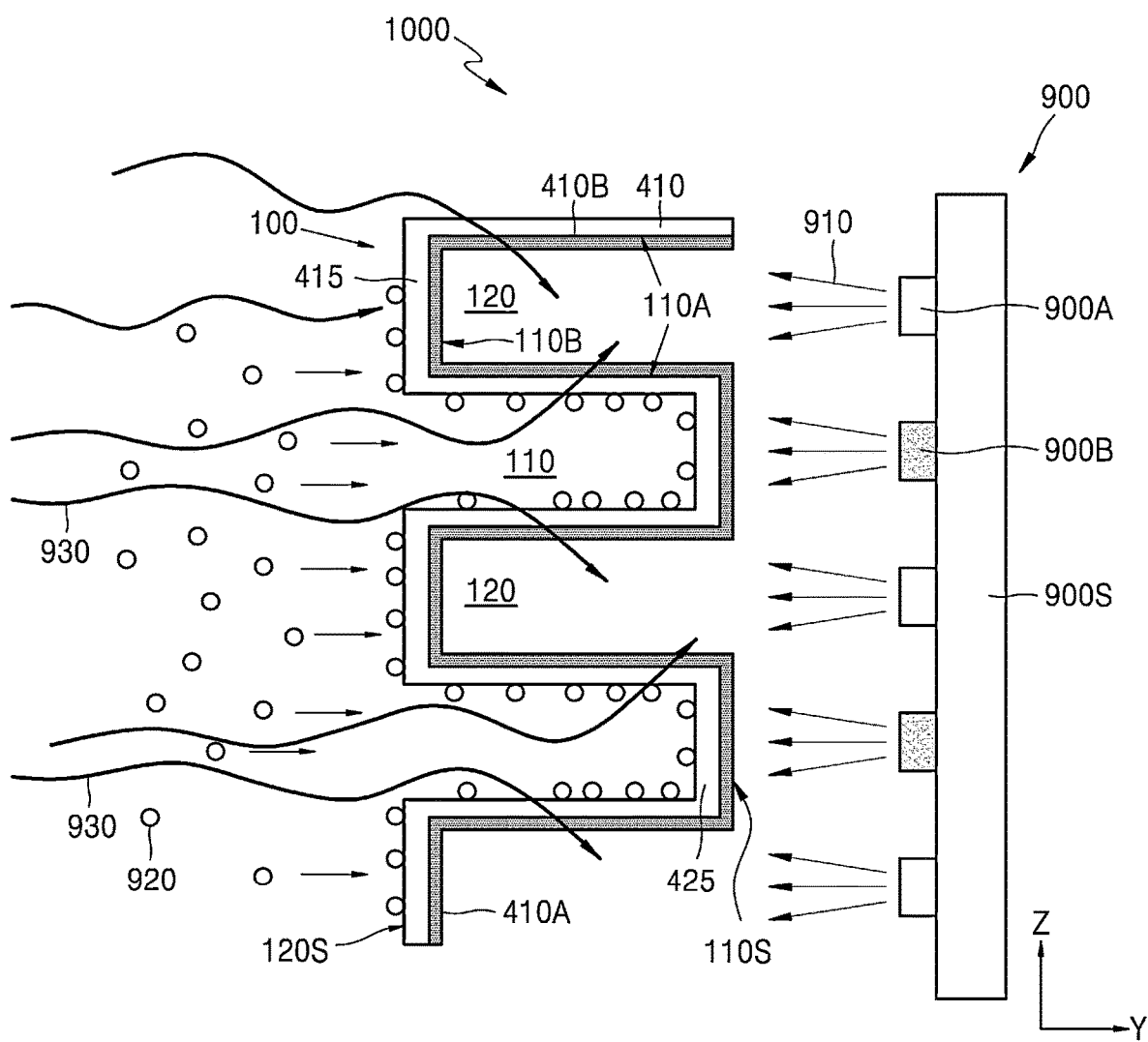
FIG. 11 is a cross-sectional view showing a case in which a light-emitting unit includes first and second light sources in the filtering system of FIG. 10.

In one embodiment, for example, the light source array of the light-emitting unit 900 of FIG. 10 may further include a second light sources 900B as shown in FIG. 11. The second light source 900B may correspond to the second surface 110S between the second grooves 120 of the first catalyst filter 100. In an embodiment where the light-emitting unit 900 includes the second light sources 9008, light may be radiated from the second light sources 900B to the second surface 110S, and the catalyst layer 410B may also be formed on the second surface 110S. In such an embodiment, as the second light sources 900B are further provided, the catalyst layer 410B formed on an inner surface of the second groove 120 may extend to the second surface 110S. Accordingly, in such an embodiment where the second light sources 900B are provided in the light-emitting unit 900, the second vertical portion 425 of the first catalyst filter 100 may also include a material into which the gaseous second material 930 is introduced like the first horizontal portion 410, and accordingly, the gaseous second material 930 may also be removed through the second vertical portion 425.

In one embodiment, for example, the light-emitting unit 900 is optical energy supply source, and the light 910 emitted from the first light sources 900A and/or the second light sources 900B may include light in an ultraviolet to visible light band.

Figure 12:
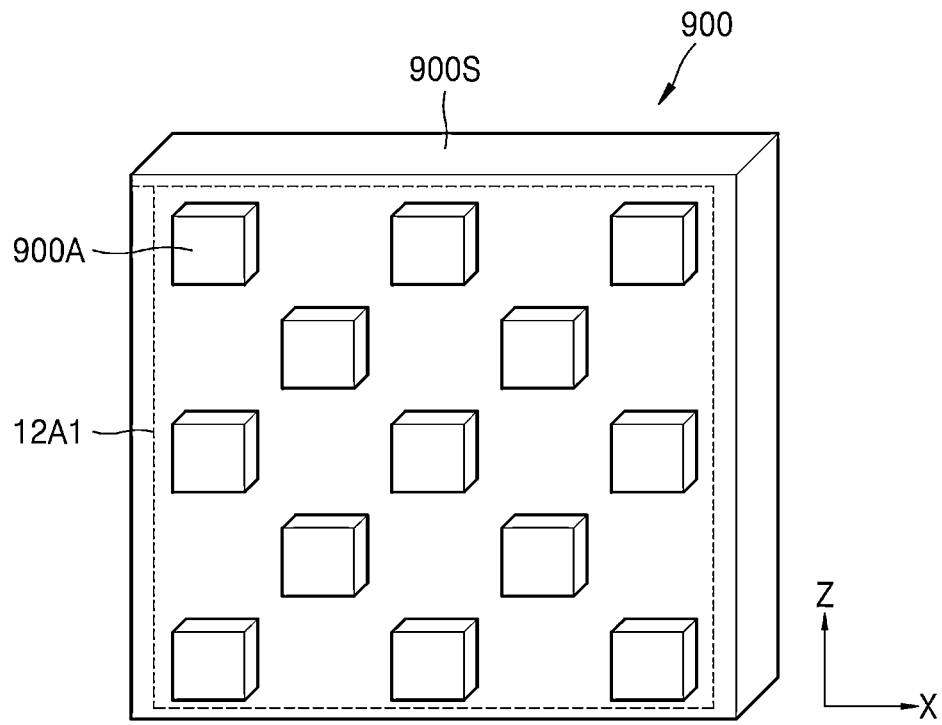
FIG. 12 is a perspective view showing the light-emitting unit of FIG. 10.

FIG. 12 shows a perspective view of the light-emitting unit 900 of FIG. 10.

Referring to FIG. 12, in an embodiment, a first light source array 12A1 is provided on one surface of the substrate 900S. The first light source array 12A1 includes a plurality of first light sources 900A. The first light source array 12A1 may be provided on an air discharge side of the catalyst filter 100 and may face the second groove 120 on the air discharge side. An arrangement form of the plurality of first light sources 900A may be the same as that of the second grooves 120 of FIG. 3. In such an embodiment, a distance between the centers of the adjacent first light sources 900A may be the same as that of the centers of the adjacent second grooves 120. The number of the plurality of first light sources 900A may be the same as the number of second grooves 120 on the air discharge side of the catalyst filter 100, that is, the number of channels. Accordingly, the plurality of first light sources 900A constituting the first light source array 12A1 may correspond one-to-one with the channel on the air discharge side of the catalyst filter 100. In one embodiment, for example, the first light source 900A may only include one light source. In one embodiment, for example, the first light source 900A may include a plurality of light sources. In one embodiment, for example, a light source included in the first light source 900A may be a light-emitting diode ("LED"), but is not limited to an LED, and any light source that emits light capable of forming a catalyst layer on the surface of the second groove 120 may be used as the first light source 900A.

Figure 13:
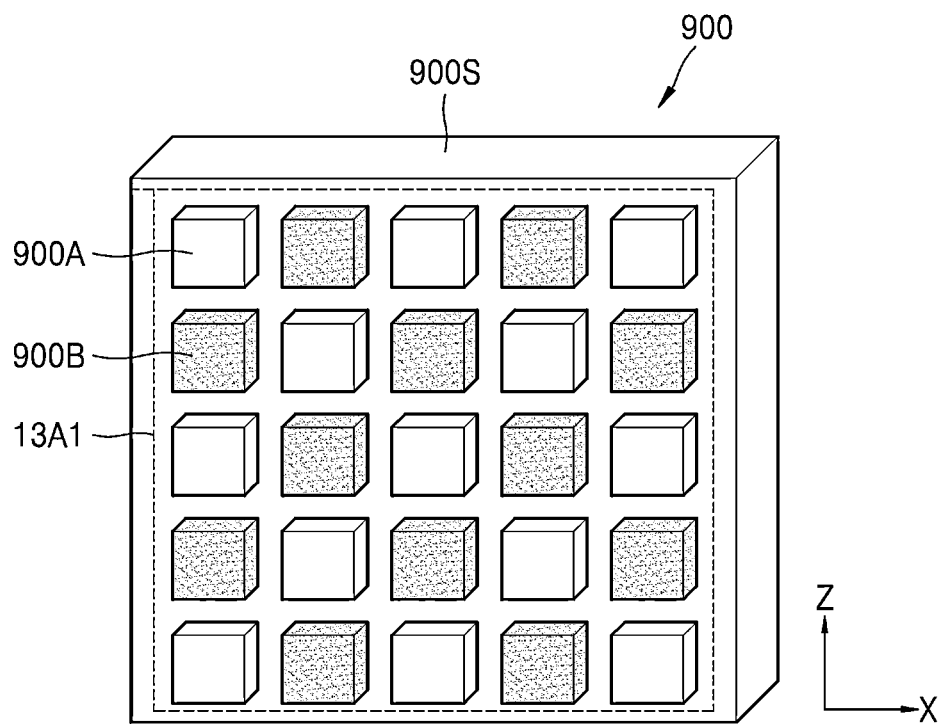
FIG. 13 is a perspective view showing the light-emitting unit of FIG. 11.

FIG. 13 is a perspective view of the light-emitting unit 900 of FIG. 11.

Referring to FIG. 13, in an embodiment, a second light source array 13A1 is provided on one side of the substrate 900S. The second light source array 13A1 includes a plurality of first light sources 900A and a plurality of second light sources 900B. The arrangement form of the plurality of first light sources 900A may be the same as that of the first light source array 12A1 of FIG. 12. The plurality of second light sources 900B are arranged to correspond one-to-one with the second surface 110S between the second grooves 120 on the air discharge side of the catalyst filter 100. The plurality of second light sources 900B may be located between the first light sources 900A, and the arrangement form of the plurality of second light sources 900B may be the same as that of the plurality of first light sources 900A. That is, if the plurality of first light sources 900A or the plurality of second light sources 900B are moved in the X-axis or Z-axis direction, the plurality of first light sources 900A and the plurality of second light sources 900B may exactly overlap each other.

Figure 14:
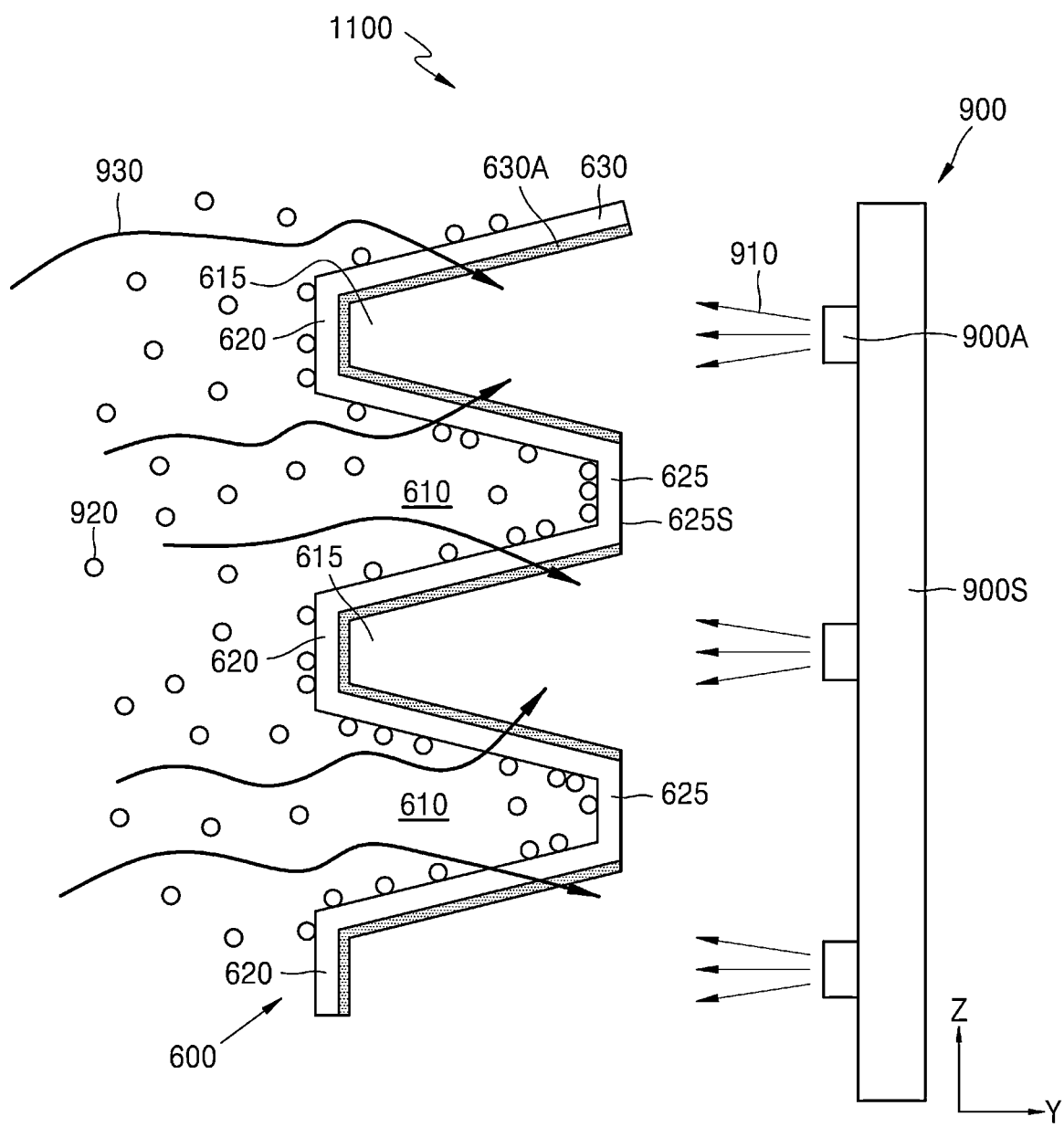
FIG. 14 is a cross-sectional view of a filtering system including a ceramic catalyst filter according to an alternative embodiment.

FIG. 14 shows a second filtering system 1100 including a recyclable ceramic catalyst filter according to an alternative embodiment. The same or like elements shown in FIG. 14 have been labeled with the same reference characters as used above to describe the embodiment of the first filtering system 1000 shown in FIG. 10, and any repetitive detailed description thereof will hereinafter be omitted or simplified.

Figure 15:
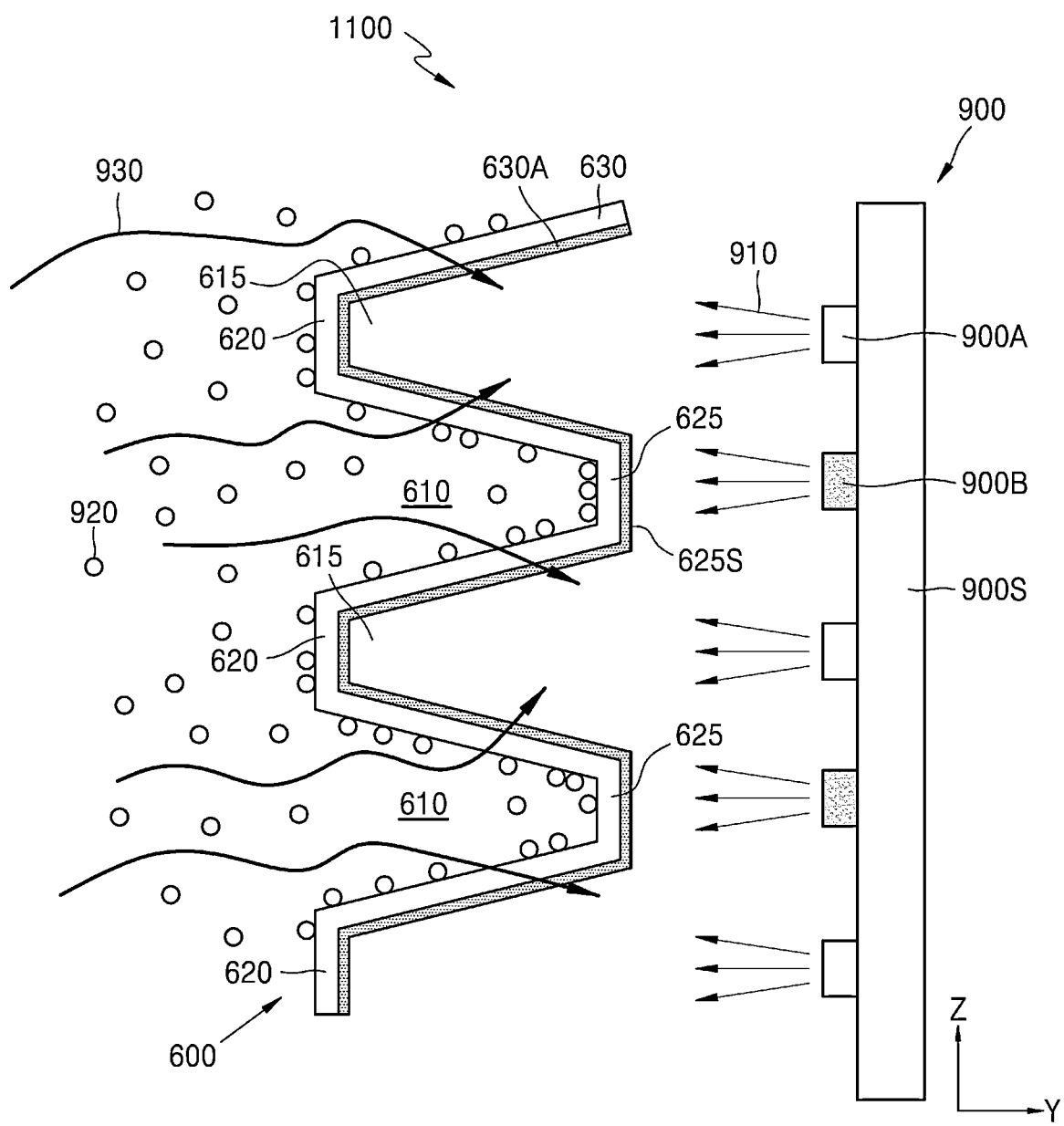
FIG. 15 is a cross-sectional view showing a case in which the light-emitting unit of the filtering system of FIG. 14 includes first and second light sources.

Referring to FIG. 14, an embodiment of the second filtering system 1100 includes a second catalyst filter 600 and a light-emitting unit 900. The second groove 615 of the second catalyst filter 600 may face the first light source 900A of the light emitting unit 900. The second groove 615 may correspond one-to-one with the first light source 900A. The second groove 615 has a shape that is spread toward the light-emitting unit 900, and a size or length of the second groove 615 increases in the + direction of the Y-axis. That is, the size or length of the second groove 615 increases as being closer the light-emitting unit 900 gets the first light source 900A. Accordingly, all of inner side surfaces of the second groove 615 may be exposed to the light 910 emitted from the first light source 900A. As a result, the surfaces, which face the first light source 900A, of the second groove 615 of the second catalyst filter 600, that is, the side and bottom surfaces of the second groove 615, absorb light, and thus, may become an activated catalyst layer 630A. Accordingly, the second material 930 passing through the surfaces facing the first light source 900A of the second catalyst filter 600 may be decomposed by a catalyst reaction. The surfaces facing the light-emitting unit 900 of the second catalyst filter 600, that is, the side and bottom surfaces of the second groove 615 and the second surface 625S of the second vertical portion 625 are collectively referred to as a second surface 625S of the second catalyst filter 600. In an embodiment, as shown in FIG. 14, among the second surfaces of the second catalyst filter 600, the activated catalyst layer 630A is formed on the entire inner surface of the second groove 615 facing the first light source 900A, but not being limited thereto. Alternatively, as shown in FIG. 15, the second light source 900B is provided in the light-emitting unit 900 corresponding to the second vertical part 625, and the catalyst layer 630A of the second groove 615 may extend to the second surface 625S of the second vertical portion 625. In such an embodiment, the second surface of the second catalyst filter 600 may be a surface that removes the second material 930 or changes the second material 930.

In the second filtering system 1100, an area of a surface of the second catalyst filter 600 facing the light-emitting unit 900 is relatively greater than that of the first catalyst filter 100, and an area of the catalyst layer 630A formed in the second filtering system 1100 may be relatively greater than that of the first filtering system 1000. Accordingly, the filtering efficiency of the second filtering system 1100 may be relatively greater than that of the first filtering system 1000.

Figure 16:
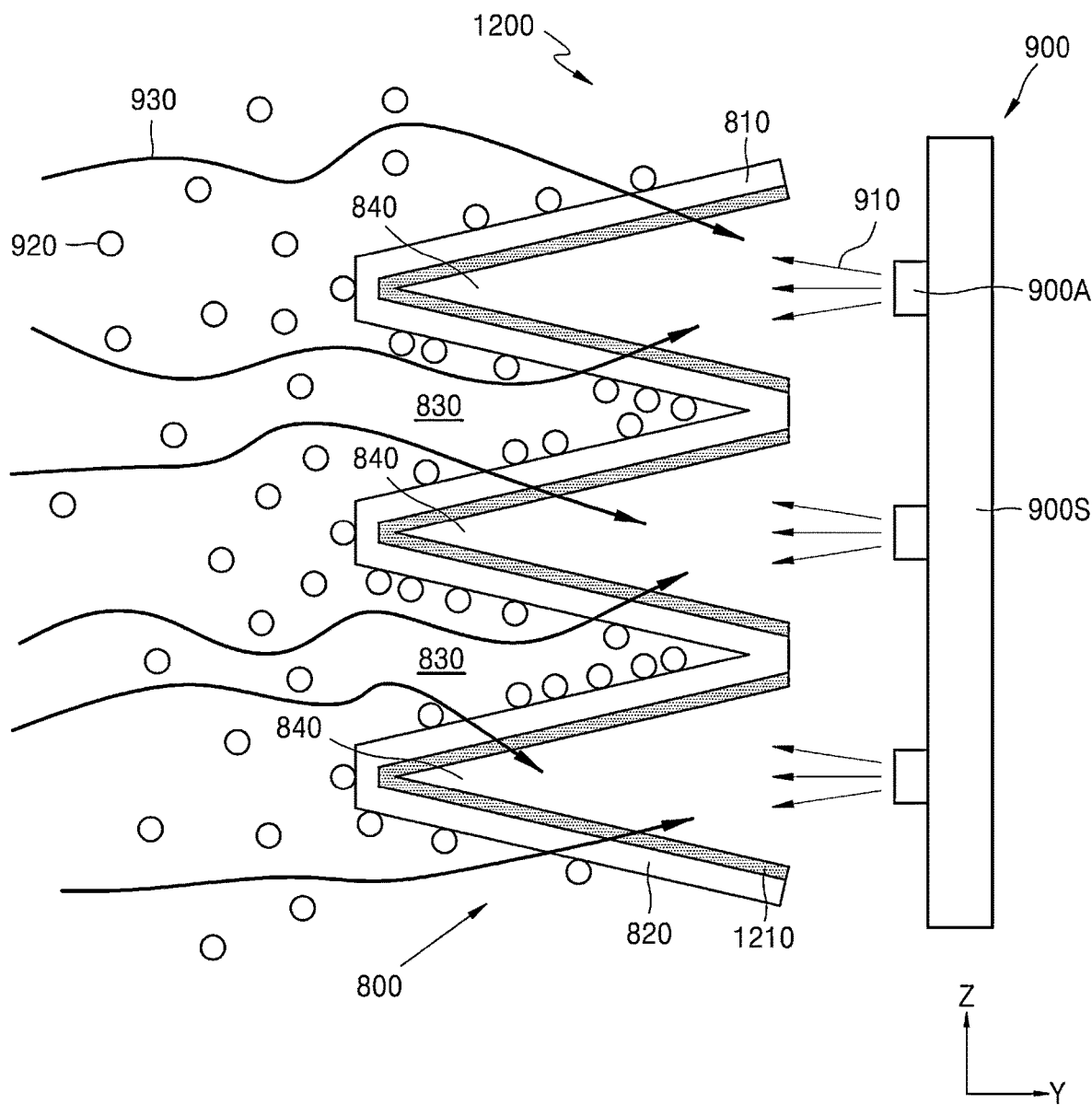
FIG. 16 is a cross-sectional view of a filtering system including a ceramic catalyst filter according to another alternative embodiment.

FIG. 16 shows a third filtering system 1200 including a recyclable ceramic catalyst filter according to another alternative embodiment. The same or like elements shown in FIG. 14 have been labeled with the same reference characters as used above to describe the embodiment of the second filtering system 1100 shown in FIG. 14, and any repetitive detailed description thereof will hereinafter be omitted or simplified.

Referring to FIG. 16, an embodiment of the third filtering system 1200 includes a third catalyst filter 800 and a light-emitting unit 900. The third filtering system 1200 may be the same as the second filtering system 1100 of FIG. 14, except that one of the ends of the first inclined portion 810 is in contact with one of the ends of the second inclined portion 820. Like the second groove 615 of the second filtering system 1100, both inner side surfaces of the second groove 840 are exposed to the light 910 supplied from the light-emitting unit 900. Accordingly, light may reach the inclined side surfaces of the second groove 840, and thus, an activated catalyst layer 1210 may be formed on the inclined side surfaces thereof. In such an embodiment, the inclined side surfaces to which the light reaches may become the catalyst layer 1210.

Figure 18A:
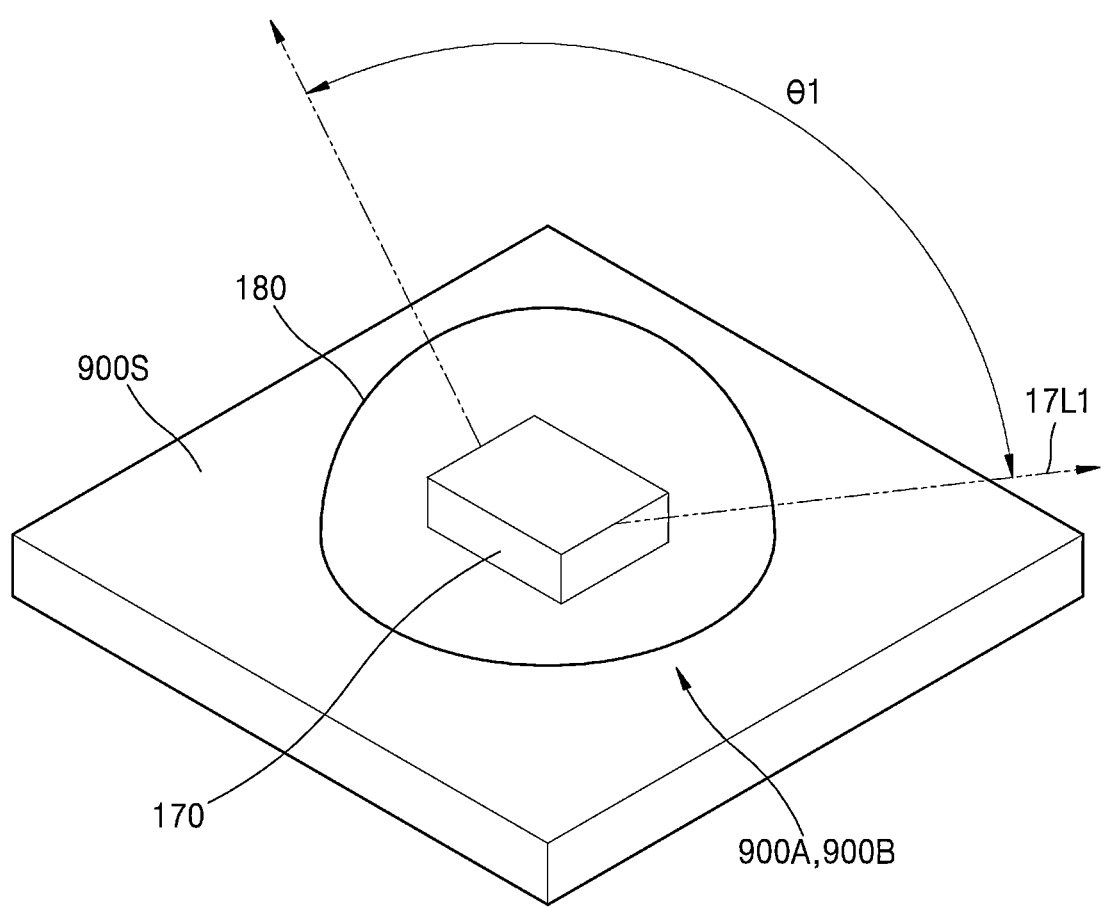
FIGS. 18A and 18B are perspective views of the first light source and the second light source in the filtering system of FIGS. 10 to 16.
Figure 18B:
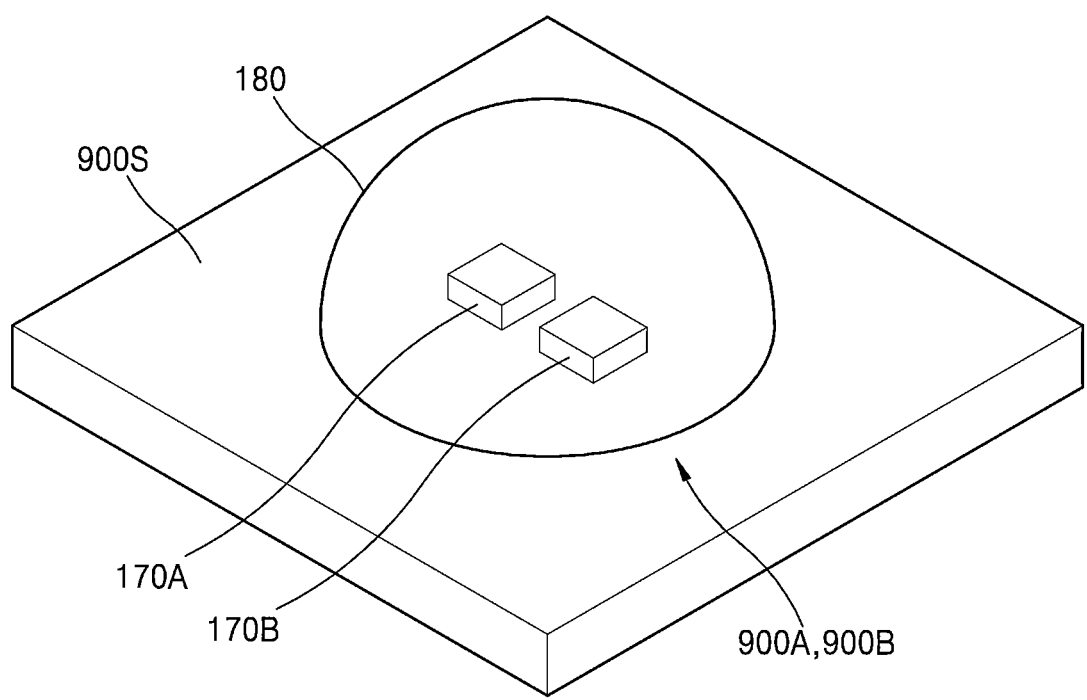

FIGS. 18A and 18B are perspective views of the first light source or the second light source in the filtering system of FIGS. 10 to 16.

Referring to FIG. 18A, the first or second light source 900A or 900B provided on the substrate 900S includes a first light-emitting device 170 and a capsule 180 for sealing and protecting the first light-emitting device 170. In one embodiment for, example, the first light-emitting device 170 may be an LED or include an LED. The substrate 900S may include a controller configured to control an operation of the first light-emitting device 170, for example, a circuit unit. The capsule 180 is disposed or formed on the substrate 900S and may be provided to cover the entire first light-emitting device 170 on the substrate 900S. The capsule 180 may include a material that is transparent to at least light 17L1 emitted from the first light-emitting device 170. In one embodiment of example, the material of the capsule 180 may be glass or a light permeable material. An output of the first light-emitting device 170 may be the same as or different from each other depending on the catalyst filter of the filtering system described above, and a radiation angle θ1 of the light 17L1 emitted from the first light-emitting device 170 may be also the same as or different from each other. In one embodiment, for example, the output of the first light-emitting device 170 may be in a range of about 1 milliwatt (mW) to about 200 mW, but is not limited thereto. In one embodiment, for example, a power of the light 17L1 output from the first light-emitting device 170 may be in a range of about 1 mW to about 200 mW, but is not limited thereto. A radiation angle θ1 of the first light-emitting device 170 may be in a range of about 10° to 120°, but is not limited thereto. In one embodiment, for example, the shape (structure) of the capsule 180 may affect the radiation angle θ1 of the first light-emitting device 170. In such an embodiment, by adjusting the material, thickness, and/or external shape of the capsule 180, the radiation angle θ1 of the first light-emitting device 170 may be controlled within a given range. The radiation angle of the first light source 900A may denote the radiation angle of light passing through the capsule 180. In one embodiment, for example, the radiation angle of the first light source 900A may be the same as the radiation angle θ1 of the first light-emitting device 170, or may be greater or less. The characteristics of the first light source 900A described above may be directly applied to the second light source 900B.

In one alternative embodiment, for example, as shown in FIG. 18B, the first light source 900A or the second light source 900B may include a plurality of light-emitting devices 170A and 170B in the capsule 180. In an embodiment, as shown in FIG. 18B, two light-emitting devices 170A and 170B are included in the capsule 180, but not being limited thereto. Alternatively, two or more light-emitting devices may be included in the capsule 180. The plurality of light-emitting devices 170A and 170B provided in the capsule 180 may have the same structure or the same light-emitting characteristics as each other. In one embodiment, for example, each of the plurality of light-emitting devices 170A and 170B in the capsule 180 may be LEDs or include LEDs.

In embodiments, as described herein, the ceramic catalyst filter include a single body frame or single structure including a catalytic material. Accordingly, the catalyst filter does not use a separate supporter. In addition, in the ceramic catalyst filter, the single body filter frame has a wall-flow structure configured to filter particle components (e.g., fine dust, microorganisms, etc.) from harmful materials flowing into the catalyst filter and to pass gas components (e.g., VOC). A filtering system including such a catalyst filter includes a light-emitting unit including a light source array including a plurality of light sources. As a gas component passes through a channel of the catalyst filter, light is radiated to each channel of the catalyst filter from the light-emitting unit, and the catalyst layer of the catalyst filter is activated by the light radiation. A plurality of light sources included in the light source array may be provided to correspond one-to-one with the opening channels of the ceramic catalyst filter on an air discharge surface side of the ceramic catalyst filter. Accordingly, light may be radiated deep inside the open channel of the ceramic catalyst filter, and thus, an area of the catalyst layer in each channel of the ceramic catalyst filter may be increased.

The gas component flowing into the ceramic catalyst filter is decomposed and removed by a catalytic reaction while passing through the catalyst layer, and as described above, because an area of the catalyst layer activated by absorbing light from the channel of the catalyst filter increases, the removal efficiency of the gas component may be increased.

As a result, in embodiments, when a filtering system including the disclosed ceramic catalyst filter is used, gas components, such as VOC together with particle components included in the air may be simultaneously removed, and as an area of the catalyst layer activated by absorbing light increases, the removal efficiency of the gas component may be further increased. In such embodiments, because the channel of the catalyst filter and the light source of the light source array are provided in a one-to-one correspondence, the reduction of the size of the filtering system may be possible.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:
1. A filtering system comprising:
 a catalyst filter including a plurality of channels through which air is introduced; and
 a light-emitting unit which radiates light towards a surface of the catalyst filter from which air is discharged for catalyst activation, wherein the light radiated from the light-emitting unit activates the surface of the catalyst filter from which air is discharged, wherein the light-emitting unit includes a light source array including a plurality of first light sources corresponding one-to-one with the plurality of channels.

2. The filtering system of claim 1,
wherein each of the plurality of first light sources includes:
a substrate;
a first light-emitting device on the substrate; and
a capsule which seals the first light-emitting device on the substrate.

3. The filtering system of claim 2,
wherein only one first light-emitting device is in the capsule.

4. The filtering system of claim 2,
wherein each of the plurality of first light sources further includes a second light-emitting device on the substrate in the capsule together with the first light-emitting device.

5. The filtering system of claim 4,
wherein the second light-emitting device includes a light-emitting diode.

6. The filtering system of claim 2,
wherein the first light-emitting device includes a light-emitting diode.

7. The filtering system of claim 1,
wherein the light source array further includes a plurality of second light sources corresponding one-to-one with an area between the channels of the catalyst filter and are provided to radiate light to the area.

8. The filtering system of claim 7,
wherein each of the plurality of second light sources includes:
a substrate;
a first light-emitting device on the substrate; and
a capsule which seals the first light-emitting device on the substrate.

9. The filtering system of claim 8,
wherein only one first light-emitting device is in the capsule.

10. The filtering system of claim 8,
wherein each of the plurality of second light sources further includes a second light-emitting device on the substrate in the capsule together with the first light-emitting device.

11. The filtering system of claim 10,
wherein the second light-emitting device includes a light-emitting diode.

12. The filtering system of claim 8,
wherein the first light-emitting device includes a light-emitting diode.

13. The filtering system of claim 1, further comprising:
at least one selected from an electrical energy source, an ionic energy source, and a thermal energy source.

14. The filtering system of claim 1,
wherein the catalyst filter includes:
a single body structure including a first surface which blocks a first material, and a second surface from which a second material passed through the first surface is removed,
wherein the second surface is a portion to be activated as a first catalyst layer which removes the second material by the light radiated thereto.

15. The filtering system of claim 14,
wherein the single body structure is porous.

16. The filtering system of claim 14,
wherein the single body structure includes a same catalyst material as a whole.

17. The filtering system of claim 16,
wherein the same catalyst material includes a photocatalytic material which is activated by the light radiated to the second surface.

18. The filtering system of claim 16,
wherein the same catalyst material includes a metal compound.

19. The filtering system of claim 14,
wherein each of the first and second surfaces includes surfaces parallel to each other in vertical and horizontal directions.

20. The filtering system of claim 14,
wherein a second catalyst layer is further disposed on the second surface.

21. The filtering system of claim 20,
wherein the second catalyst layer includes a catalyst layer to be activated by different energy together with the light radiated to the second surface.

22. The filtering system of claim 14,
wherein the single body structure includes:
a plurality of first grooves with inlets on a side thereof through which the first and second materials are introduced; and
a plurality of second grooves with inlets on a side thereof through which the second material is discharged.

23. The filtering system of claim 14,
wherein the first material includes fine dust or microorganisms, and
the second material includes a volatile organic compound.

* * * * *